Jan. 27, 1942.　　　　D. E. GRAY　　　　2,271,004

GLASSWORKING APPARATUS

Filed Aug. 8, 1939

INVENTOR.
DAVID E. GRAY
BY
ATTORNEY.

Patented Jan. 27, 1942

2,271,004

UNITED STATES PATENT OFFICE 2,271,004

GLASSWORKING APPARATUS

David E. Gray, Corning, N. Y., assignor to Corning Glass Works, Corning, N. Y., a corporation of New York Application August 8, 1939, Serial No. 289,043

5 Claims. (Cl. 49—5)

The present invention relates to shear mechanisms. It is at present customary in the art to flow molten glass in the form of a stream from an outlet opening in a refining tank or other container and to periodically sever the flowing glass to form individual masses or charges. In some instances the severed charges simply fall by gravity into stationary or moving molds or on to other forms of fabricating apparatus, and in other instances the charges are directed into the fabricating apparatus over guides or through suitable funnels. The present invention has to do with a severing mechanism of novel design which may be employed to sever charges which may find their way to fabricating apparatus in any manner hereinbefore mentioned, but which is also especially adapted for itself imparting such movement to the charges as will assist in their delivery to continuously moving fabricating apparatus.

One object of the present invention is a simple form of glass severing apparatus.

Another object of the present invention is a severing apparatus which at the instant of severance of the gob imparts a lateral movement thereto, so that as it is falling it is also traveling in a forward direction in synchronism with associated fabricating apparatus onto which it is to be deposited.

Figure 1:
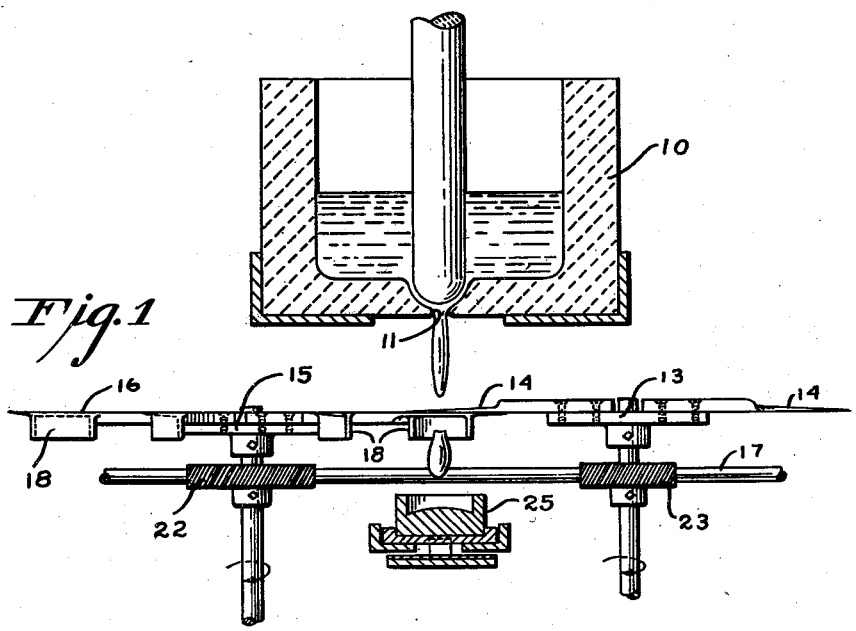
Figure 2:
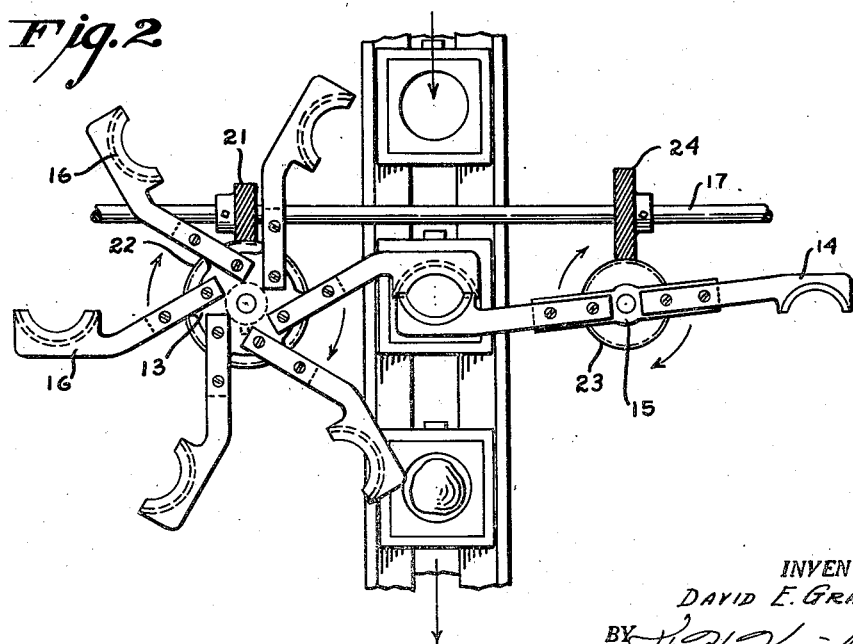

The various features of the invention employed for accomplishment of these objects and such others as may hereinafter appear, will be best understood from the following description and accompanying drawing of a preferred embodiment of the invention in which:

Fig. 1 is a side elevation of a severing apparatus embodying the invention, illustrated as being supplied with glass from an associated forehearth shown in vertical section, and arranged to deliver charges to associated molds as they successively pass under the severing apparatus; and Fig. 2 is a plan view of the apparatus of Fig. 1, but with the forehearth omitted.

In accordance with the present invention, a forehearth 10 is provided with an outlet 11 through which glass is discharged either by the action of gravity alone or by the aid of a plunger or any of the known devices for controlling the discharge of glass.

The severing means shown comprises a right hand severing unit 13 having two cutting blades 14, and a left hand cutting unit 15 having six cutting blades 16. The cutting units are driven in timed relation by a power driven shaft 17 through suitable gears 21—24, the gear ratios being such that the peripheral speed of the cutting surface of the shear blades 16 is equal to the speed of travel of the associated molds 25. As shown, the ratio is such that blades 14 move three times as fast as blades 16 in order to afford proper cutting speed. As will be observed the cutting units are so mounted that the under side of blades 14 contact the upper side of blades 16 and that the latter blades are provided with depending aprons 18 for imparting lateral movement to the gobs on final severance thereof.

Although, as above explained, the blades 14 move at three times the speed of blades 16, the ratio of the number of blades may be varied with corresponding variation of relative rotary speeds as required to obtain proper cutting speed.

In the operation, at the instant of the severance of a mold charge from the downward moving stream of glass, such charge is engaged and laterally pushed by an apron 18 in the general direction of movement of the molds and at a speed corresponding thereto, thereby assuring proper deposit of the charge.

If the severing apparatus is to be employed in combination with molds which are stationary while being charged, the aprons 18 are omitted.

Although the molds to which the charges are fed are shown as traveling in a straight-line path, such molds can as well be arranged in an annular row on a suitable mold table. Such table preferably would have its axis of rotation located to the left of the axis of the severing unit 15. Obviously, the speed of rotation of the mold table would be such as to successively bring the molds into substantially vertical alignment with the active cutting blades and would remain in substantial alignment therewith until after receipt of a charge.

What is claimed is:

1. In an apparatus for severing charges from a downwardly moving stream of molten glass, two cooperative shearing units supported on shafts having different axes of rotation and blades on the shearing units which are in cutting relation as they pass through the axis of the stream, means associated with one of said units for imparting movement to a charge in a direction lateral to the stream, means for rotating said one unit at a speed dependent on the speed of lateral movement desired, and means for rotating the other unit at a speed higher than that of said one unit.

2. The combination of a series of molds moving transversely of the direction of a down flowing stream of molten glass, of a shear mechanism comprising shear blades moving in unison with the molds about an axis parallel with the axis of the stream, said shear blades being so disposed as to successively intersect the stream and cooperating shear blades operated in timed relation with the first shear blades to successively intersect the stream as the first mentioned shear blades are moved into stream intersecting position.

3. In a glass working apparatus a series of continuously moving molds, a shear mechanism synchronized with the movement of the molds and comprising shear blades rotatable about axes parallel with the axis of a stream of molten glass to be sheared, said blades crossing the axis of the stream simultaneously to sever glass therefrom and one of said blades being moved in a direction and at a speed coinciding with the direction of movement and speed of the molds, and means associated with said latter blade for imparting a lateral thrust to the glass after severance from the stream.

4. In a glass severing apparatus a pair of rotatable shear units cooperative with one another to shear charges of glass from a downwardly moving stream, an apron depending from one of said units, a moving support carrying molds to be charged in succession with glass sheared from the stream, means for moving the unit having a depending apron at a speed approximately that of the movement of said support to move a severed charge to assist in its delivery into one of the molds, and means for moving the other unit at a higher speed to produce an effective cooperative cutting action of said units.

5. In a glass severing apparatus a pair of rotatable shear units arranged to simultaneously move through a downwardly moving stream of molten glass to shear charges from the lower end thereof, an apron depending from one of said units, molds moving beneath the shear units in a direction transversely of the axis of the stream, means for moving the apron equipped shear unit at a speed comparable with the speed of movement of said molds to move a severed charge in a manner to assist in its delivery into one of said molds, and means for moving the other shear unit at a relatively higher speed to produce an effective cooperative cutting action of said units.

DAVID E. GRAY.